5833X No Printed Specification Available
J. Stimpson.
Car Truck.
Patented Feb. 16, 1830.
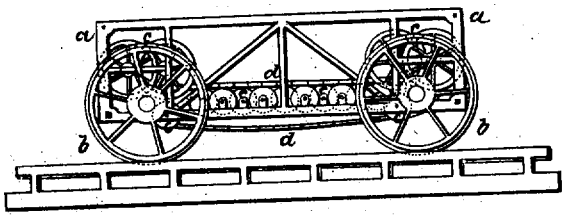

James Stimpson Baltimore Maryland

Letters Patent.

The Schedule referred to in these Letters Patent and making part of the same, containing a description, in the words of the said James Stimpson, himself, of his improvement, in the application of horse or other animal power, for propelling carriages on Railways or Roads.

To all to whom these presents shall come.

Be it known that I James Stimpson of the City and County of Baltimore & State of Maryland have invented a new & useful improvement in the application of horse or other animal power for propelling carriages on railways or, roads, which improvement consists in this, that the horse or other animal travels and rides at the same time on the carriage which by this power is is moved, & any degree of velocity can be imparted to the carriage, which never tires by a steady but moderate movement of the animal which of course enables him to perform a greater length of time under any speed of the carriage, than he otherwise possibly could if its rate of speed depended, as it ordinarily does, entirely on the degree of activity of the animal. To gain this great desideratum the construction or make of the machine or carriage must be as follows, Viz; There must be two main shafts or axles of sufficient size and strength of iron or other materials, with four wheels fitted to run loose, yet close on said shafts & at such distance as will fit the rails of the road on which they are intended to run, there is to be fixed fast on said axle, a nut or other fixture on the outside of said wheels, to prevent them from running off of the shafts, to which nut or fixture, is entered a dog, fall, or catch on a centre or pin against which a spring acts or presses outwards sufficiently to throw said fall catch Portfolio catch or dog into ratch teeth fixed on the side of the hub of said
wheel next to the fall, by which means when the shafts are
turned round by the power of the animal, one end of said fall
being fast to the shaft, thro' the intervention of the nut or other
fixture, the other end set against the teeth of the ratch wheel, so
will cause the road wheel to revolve as fast as the shaft: at
the same time in passing a curve in the railway, the wheel on
the outer circle is at liberty to revolve faster than the shaft or the
wheel on the inner circle of the rail; hence the wheels are so
always at liberty to advance, but cannot recede without turning
the shaft with them; said falls or ratch teeth may also be
placed on the inside of the wheels if more convenient. 
Furthermore, four fast pulleys or drums are to be fixed upon
said axles within the road wheels & at such a distance as to
bring them directly under the animals feet, & sufficiently thick
or wide to receive bands six to twelve inches wide or any
other width; & of such diameter compared to that of the
road wheels as will produce any rate of speed, desired.
On these bands is to be laid a floor, each plank or board
of which is to extend across & beyond the bands on both sides
six inches more or less & fastened by iron bolts, with thin wide
heads; in the range of the bolt heads, or directly under them a
groove must be turned in the drums or pulleys for the admissi
on of the heads of said bolts, so that they may not raise the
bands from the drums as they revolve round them; the bolts
are to extend about half an inch more or less into the boards
or planks above said bands, with a nut to be screwed down
close into a cell or hole large enough for said nut to turn in;
and after being forced down tight with a wrench, a plug is
to be driven in tight over it to prevent its coming off, and the
animals feet from touching it; said bands are to be thus
entirely covered with boards or planks, laid across one
foot wide more or less, each having two to four bolts in the
middle middle of them & all on a line with each other, by reason of which they will pass round the drums without varying the tightness of the bands & without any liability of splitting the boards or planks, which may also be fastened to the bands by wood screws nails or other means in like manner. The two main axles on which the bands and floor revolve must be at a distance sufficient to prevent the animals feet from extending beyond their centres either way. & between the drums on the main axles, must be placed one or a double row of pulleys two on each shaft near the outer ends, & directly under the horses or animals feet, and bands in a line with those on the main axle. the upper peripheries of which must be on a line horizontal with those or sunk a little below, & as near to each other as they can be without touching for the support of the revolving & flexible floor, & which will effectually prevent the floor from sinking beneath the tread of the animals feet. If two rows of pulleys or drums under each band be used, the outside rows should extend to the outer edges of the bands & be four inches thick if for ten inch bands, & lie as near to each other as they can, leaving a sufficient space for the shaft of the inside rows to pass between the peripheries of the outside rows without touching. The pulleys of the inside rows should be six inches thick, being so turned that they shall just clear the insides of the outside pulleys or drums, those two next to the main axles should be lagged in the middle reaching to, but not quite touching the insides of those on the main shafts or axles, & raised as much above those on each side, as the thickness of the bands, by which means they will, receive & support the the [illegible] floor, as it revolves past the first [illegible] or hollow of the outside drums. The centres of all the middle or outside pulleys should rest on friction wheels, either on one, two or three, if on one wheel only there must be a slot in the rail to support the shaft above it, if [illegible] or two, they must lay side by side on a horizontal line

5833X line, their centres sufficiently distant to let each pass the periphery
of the other without touching, in which position they leave a
place for the pulley shafts to rest in without other support; and
thirdly, if on three rollers, two must be fixed in the frame or
side of said carriage, one on each side of the shafts of the
pulleys, and the third directly underneath it on which the
pulley shaft is to revolve and bear its whole weight, or the
pulleys may rest on their own bearings, without any friction
rollers whatever. A frame of sufficient heighth, length & width
is to be made to receive the animal or animals &c. and of
sufficient depth to receive the friction wheels of the pulleys
under the floor bands, & a part of the sides, at least must be
double to support the centres of eight other friction wheels:
(but if the machine is made without any friction wheels, there
must be two main timbers running thro' & extending beyond
the wheels each way for their protection; & also in this par=
ticular for that with friction wheels) their under edges will
be above and rest upon the boxes of the main axles of the
road wheels; the side posts must pass down sufficiently below
these side timbers or rails to receive crossbars, on which must be
placed two rails laying parallel to each other & reaching nearly
from one axle to the other, & of sufficient width & thickness to
sustain the pulley shafts under the floor bands on this frame
the weight of the pulleys & animals rest. The eight friction wheels
are for the whole frame to rest upon, & their under peripheries
move with and upon the axles of the first described road wheels
said friction wheels may be of any dimensions in diameter
or thickness, which may be found most convenient to use
with their centres as before described in the second proposition
or the carriage may rest upon boxes without any friction
wheels whatever. The road wheels are made to revolve by the
horse or other animals moving at any rate of speed, upon the
revolving floor; there must also be inside and near each
end end of said main axles another friction wheel, located in the
frame of the carriage to sustain them in their places under the
contraction of the floors bands, & also to keep the axles in the centres
of the castings of the eight friction wheels on which the car rests
These friction wheels will always keep the two axles on a
parallel line with each other but will admit the shafter axle
to be forced forward by the bands being loose by a guide running
on the road before the carriage, for that purpose or otherwise
to turn on any curve in the road that is to say, neither end of the
forward axle can recede or move back by reason of the friction
wheel behind, but may advance, so likewise the after axle
cannot be moved forward, for the centres of the friction wheels
being fixed in the frame directly before, prevents it, but it can
be moved backward so as to conform to the front axle in
turning a curve in the road. All the friction wheels are to be
made of a thickness, conformable to the magnitude of the weight
they are intended to support, & of a diameter as extended as the
nature of their application will conveniently admit, & their
centres must always conform in length & diameter to the ex-
tension of gravity in all cases applicable to their intended use.
It is also intended in case roads or railways are not entirely
level, or horizontal throughout, but have planes & inclines so
to construct the tow-carriage as to enable the same animals to
take up the inclines as much as they can draw on a level [illegible] [illegible]
advanced speed by means of a reduction of the speed of the
tow carriage conformably to the amount of gravity of the incline
which it is necessary to ascend: At the summit the speed is again
renewed, the resistance being lessened, or the speed of the carriage
is again in unison with that of the animals as at first graduated.
This object is accomplished thus, the drums or pulleys on the main shaft
over which the bands or chain floors revolves, are to be fitted on the
shafts loose with composition or iron boxes, inside of these pulleys
or drums a fast runner dog is to be fixed to the shaft, then
a

5833X a bayonet is to be fitted on to said shaft, the forks of which
pass thro' said pulleys, and come in contact with the fast
arm or dog on the shaft, & will then cause the pulley to be
fast or a fixture to the main shaft, of course one cannot
turn without the other, but by sliding out the bayonet the
forks lose their hold and then all the drums become suffi-
ciently loose to revolve upon the main shaft of the carriage,
by doing which all motion of the carriage ceases, as the band
or floor on which the animals travel revolve round without
causing the shafts to revolve but for a small bevel or spur
pinion wheel on the outer side or edge of the bayonet hubb
being made to come into gear at the same time the forks leave
the fast dog on the inside of the pulley or drum, and the drum
is thereby free from the carriage or shaft, to communicate
any other speed or motion to the carriage which is wanted,
or the following other application of gears will do, with a
small bevil or spur gear fixed upon a small shaft, laying
fore & aft between the floor and road wheels, reaching if so
necessary to the other axle, on which shaft is also a sliding
bevel or spur gear made to come in contact with a gear or
made fast to the inside of the road wheels, & on said wheels
so fastened to the road wheels may be one, two, three or four
rows of teeth, more or less, on circles one without the other,
so that in whichever line or row of teeth the small slide gear
is made to come in contact with, the speed of the carriage will
conform to, for instance, if the gear on the face of the bayonet
hubb, has ten teeth on it, and the small gear on the shaft
parallel to the floor has ten also, the slide gear on the same
shaft having ten, in all these there is no gain or loss of speed,
but the last mentioned slide gear being made to come in contact
with the outer row of teeth on the road wheels, which row we
will say has forty teeth in it, it will reduce the speed of the
carriage to the actual speed of the animal, altho' the previous
speed speed of the carriage was four times faster. The aforesaid
small gear shaft must be centred in two studs or boxes which
must be fastened to a frame by itself & that again so attached
to the main frame of the carriage as to allow it to move
forward & back by means of a fork straddling the main shaft
& connected to the slide frame so that when the main shaft
is moved to conform to the curves of the road, the gears will
all maintain their relative bearings & connections with each
other, but this is only necessary when the main axles are allowed
to vibrate to the curves of the road; if it is necessary to convey
the power of the animals to all the road wheels, it may be done
by a pulley projecting from the pulley under the main band &
fast to it on the opposite side of the above gear, with a band
passing over it & over a pulley of the same size, made fast to the
road wheel on the other axle.

What I claim in the before mentioned carriage
as my invention or improvement is its application to horse or
other animal power, whereby he or they can travel in & upon
said carriage either upon roads or railways, & by so doing
impart a power to move said carriage either with accelerated
or diminished speed, compared with that of the actual travel
of said animals. I also claim the invention of the application
of friction wheels to sustain the weight of said animals & the
weight of the pulleys under the flexible floors; & the double rows
of pulleys or drums under each band. Also the application
of friction wheels to support the weight of the frame or
animals, apparatus, & load, connected with, & about said frame
said carriage being of itself a new & useful improvement, as a
locomotive carriage before unknown or used. I also claim
the application of the gear principle whereby a variation of the
speed of the carriage more or less is effected without varying
that of the animals as herein before described.—

Witnesses
[illegible] [illegible]
[illegible]

James Stimpson

E. x
[illegible]

2724 [illegible] ([illegible])